March 1, 1955 R. G. LE TOURNEAU 2,703,104
VALVE ASSEMBLY
Filed July 18, 1949
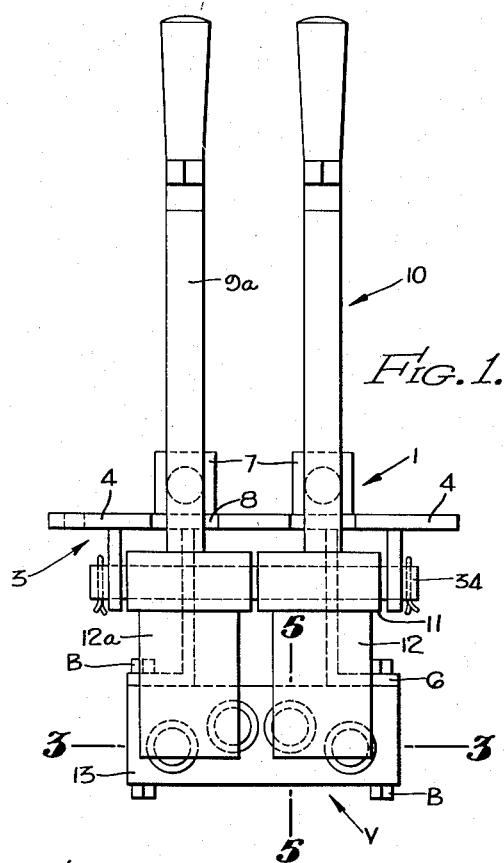
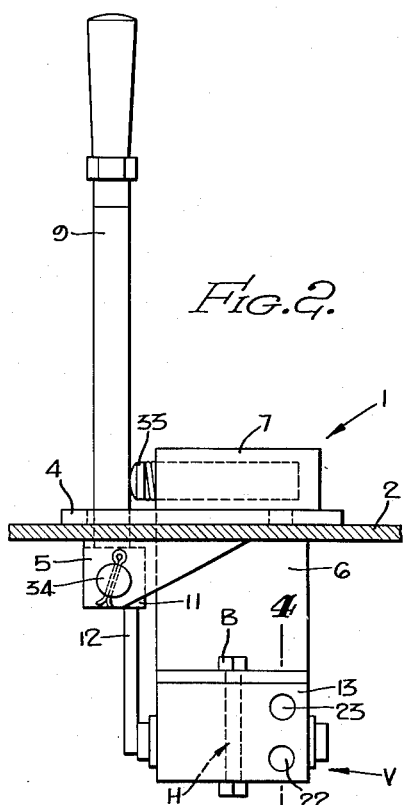
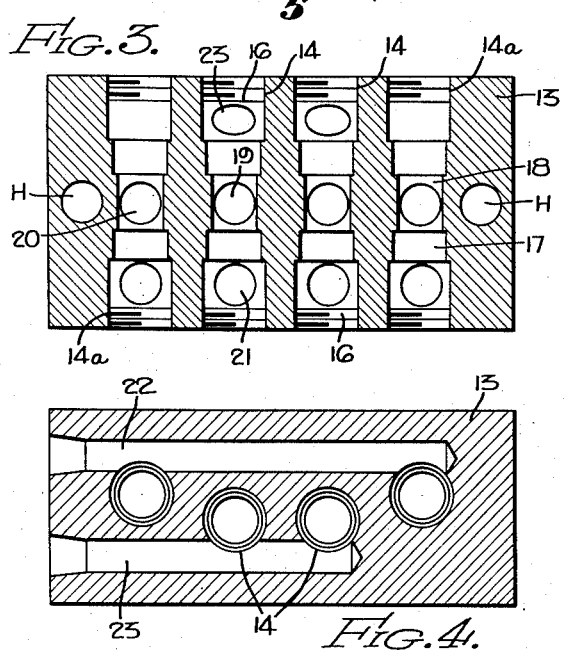
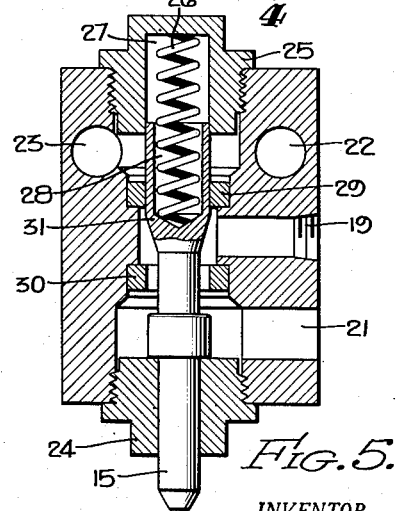
INVENTOR.
ROBERT G. LE TOURNEAU
BY Lyon & Lyon
ATTORNEYS

United States Patent Office 2,703,104
Patented Mar. 1, 1955

2,703,104

VALVE ASSEMBLY

Robert G. Le Tourneau, Longview, Tex.

Application July 18, 1949, Serial No. 105,293

2 Claims. (Cl. 137—622)

This invention relates to manually operated control valve assemblies and more particularly to such a valve assembly that includes a spring loaded lift type fluid valve in its operating circuit.

The primary object of this invention is to provide an efficient and effective valve assembly for use as the control means in a fluid operated vehicle steering system.

Another object of this invention is to provide a valve assembly in which the valve spring is normally depressed by the action of a stronger spring acting on the valve control lever.

Another object of this invention is to provide a valve assembly which is readily adaptable for installation on a vehicle.

A further object is to provide a valve assembly in which separate control handles are pivoted about a common pin and each handle operates multiple valve plungers in unison.

A still further object is to provide a valve assembly including control levers, which is simple and compact and which is readily accessible for maintenance. The valve proper being entirely contained within a unitary manifold block whereby the valve may be readily removed for replacing springs, sealing rings, or plungers, without disturbing the mounting bracket or control levers.

Yet another object is to provide a valve manifold block in which the plunger chambers are so arranged as to cooperate in certain groups with selected inlet ports in order that the desired ultimate functions may be performed by adjacent pairs of the plunger chambers.

In the drawing:

Fig. 1 represents a front view of the valve assembly complete and ready for installation.

Fig. 2 represents a side view of the assembly installed in the floor board of a vehicle.

Fig. 3 is a sectional view of the manifold block taken along line 3—3 of Fig. 1.

Fig. 4 is a sectional view of the manifold block taken along line 4—4 of Fig. 2.

Fig. 5 is a view, partially in cross-section, taken on line 5—5 of Fig. 1 showing the valve spring and plunger extended.

Referring to the drawing, Fig. 2 shows the complete valve assembly 1 installed on the floor board 2 of a vehicle. This assembly includes a bracket 3 which consists of a flat plate 4 for bolting directly to floor board 2, depending ears 5, depending L-shaped legs 6, and spring blocks 7. The forward edge of the flat plate 4 contains U-shaped indentations 8 to permit freedom of movement to handles 9 and 9a of handle assemblies 10. These assemblies are each composed of handle 9 (or 9a), a pivot block 11, and lever plate 12 (or 12a).

A valve V, bolted to the bottom of legs 6 by means of bolts B, which extend thru holes H in manifold block 13, and secure legs 6 with the top side of block 13, includes a manifold block 13 containing four plunger chambers 14 and 14a in which plungers 15 operate. These chambers are machined with a large and partly threaded portion 16 at each end, intermediate sealing ring seats 17, and a narrow throat portion 18. The inside chambers 14 are drilled and tapped for brake ports 19, while the outside chambers 14a are drilled and tapped for clutch ports 20. All chambers are drilled near one end for exhaust ports 21; while at the opposite end the outside chambers are connected with an offset clutch inlet passage 22 and the inside chambers in a similar arrangement are connected with a brake inlet passage 23. A plunger 15 is inserted in each chamber and retained at its operating end by bushing 24 which is drilled to permit the small end of plunger 15 to project therethru. At its opposite end the plunger is retained by insert plug 25 which seats spring 26 which cooperates with recessed portions 27 and 28 of the plug and plunger respectively. Intake sealing ring 29 cooperates with the enlarged spring end of 31 of the plunger, and exhaust sealing ring 30 cooperates with enlarged portion 32 near the midpoint of plunger 15.

In this particular installation, this valve assembly is utilized for steering a vehicle which includes non-steerable wheels, such as shown in my co-pending application Ser. No. 764,185, filed July 28, 1947.

In operation, the plungers 15 are normally depressed by the plates 12 and 12a in response to the pressure of a heavy duty spring 33 acting on handles 9 and 9a above the pivot pin 34. If manifold block 13 is removed from the complete assembly, handle 9 will pivot about pin 34 under the action of spring 33 until plate 12 strikes against leg 6 of bracket 3 which leg acts as a stop and permits handle 9 to remain installed when manifold block 13 is removed for maintenance purposes. Spring 33 acting at its distance from pin 34 produces a greater moment than the pressure of spring 26 acting at its lever distance, consequently spring 26 is normally depressed. At this position there is an open connection from either intake passage 22 or 23 to the corresponding clutch or brake ports 20 or 19; at the same time, the connection from ports 20 or 19 to exhaust ports 21 is blocked by the closure of the opening in sealing ring 30 by enlarged portion 32. When handle 9 is manually pulled back to overcome the pressure of spring 33, plate 12 moves away from the outside of bushing 24 and the spring 26 is allowed to expand until portion 32 shoulders against the inner portion of bushing 24. At this new position there is a direct connection from ports 19 or 20 to exhaust ports 21, but all connections with passages 22 or 23 and the functional port are blocked.

As in the previously mentioned application, this valve assembly is utilized to control steering of a vehicle by supplying fluid (air in this case) under pressure to the selected steering clutch and blocking the supply to the steering clutch on the opposite side of the vehicle. At the same time the passage to the brakes on the selected side is blocked so that only the brake on the opposite side will operate when the brake pedal is depressed. This valve assembly will provide an effective control for a steering system of the type described. In this connection consider the pair of plungers depressed by plate 12a, i. e. the plungers normally inserted in the pair of chambers 14a and 14 appearing on the left hand side of Figs. 1, 3 and 4. Clutch port 20 is in practice connected to the clutch on one side of the vehicle, while brake port 19 is connected to the brakes on the opposite side of the vehicle. Thus when plate 12a is pulled back to connect these functional ports to exhaust as described above, the clutch is disengaged on the one side and the brake cannot be applied on the opposite side.

From the foregoing description, it will be readily seen that there has been produced such a device as substantially fulfills the objects of the invention as set forth herein.

While this specification sets forth in detail the present and preferred construction of the device, still in practice such deviation from such detail may be resorted to as do not form a departure from the spirit of the invention as defined by the appended claims.

Having thus described my invention, the following is claimed as new and useful, and upon which Letters Patent is desired:

1. A fluid pressure control valve assembly for controlling the steering of a vehicle comprising a manifold block; a plurality of staggered chambers in the block; a first inlet passage connecting with certain of the chambers; a second inlet passage connecting with the other chambers; functional ports in the block connecting with said chambers; exhaust ports connecting with said chambers; a spring-loaded plunger in each of the chambers having raised portions thereon; valve seating means mounted on the block for cooperation with the raised portions of the plungers; a mounting assembly for detachably mounting the block; and releasable plunger engaging means on the mounting assembly for biasing the plungers in one position to provide passageways between said inlet passages and said functional ports; whereby upon release of said engaging means, the plungers move to provide passageways between the functional ports and the exhaust ports.

2. A fluid pressure control valve assembly for controlling the steering of a vehicle comprising a manifold block; a first pair of chambers therein each having a brake port and an exhaust port connected therewith; an inlet passage intercepting both said chambers; a second pair of chambers in the block each having a clutch port and an exhaust port connected therewith; a separate inlet passage intercepting the second pair of chambers; spring-loaded plungers in each of the chambers having raised portions cooperating with valve seats in the chambers, each of said plungers adapted in its spring-biased position to close the passageway between the chamber inlet passage and its respective brake or clutch port, and to provide an open path between the brake or clutch port and the exhaust port; plunger depressing means engaging one pair of plungers, said pair comprising the plunger of one chamber having a brake port and the plunger of one chamber having a clutch port; and separate plunger depressing means engaging the other pair of plungers; whereby upon selective movement of a given plunger depressing means, said passageway is opened and said path is closed.

References Cited in the file of this patent

UNITED STATES PATENTS

| | | |
|---|---|---|
| 1,574,766 | Thurtell | Mar. 2, 1926 |
| 1,755,643 | Gapp | Apr. 22, 1930 |
| 1,956,554 | Baldwin | May 1, 1934 |
| 2,097,397 | Heinrich | Oct. 26, 1937 |
| 2,101,025 | Hunt et al. | Dec. 7, 1937 |
| 2,116,806 | Zinkil | May 10, 1938 |
| 2,345,224 | Upp | Mar. 28, 1944 |
| 2,395,811 | Griffith | Mar. 5, 1946 |
| 2,428,150 | Field | Sept. 30, 1947 |

FOREIGN PATENTS

| | | |
|---|---|---|
| 9371 | Great Britain | Apr. 13, 1897 |